Patented May 11, 1954

2,678,309

UNITED STATES PATENT OFFICE 2,678,309

FLAMEPROOF MIXED HALOALKYL PHOSPHATE-LOWER ALIPHATIC ACID ESTER OF CELLULOSE AND PROCESS FOR PREPARATION THEREOF

Norman Van Gorder, Scotch Plains, and Walter D. Paist, Berkeley Heights, N. J., assignors to Celanese Corporation of America, New York, N. Y., a corporation of Delaware No Drawing. Application May 18, 1950,
Serial No. 162,824

15 Claims. (Cl. 260—219)

This invention relates to cellulose derivatives and relates more particularly to certain novel organic derivatives of cellulose, which are highly resistant to burning.

An object of this invention is the production of novel organic derivative of cellulose materials which are non-flammable.

Another object of this invention is the provision of an improved process for the treatment of organic derivative of cellulose textile materials whereby said materials are chemically reacted with a flameproofing agent so as to modify the structure of said cellulose derivatives and render the same completely resistant to burning by self-propagation of a flame.

A further object of this invention is the provision of flameproofing agents comprising certain novel haloalkylhalophosphonates which are adapted to be reacted with cellulose derivative materials having free hydroxy groups to render the same flameproof.

Other objects of this invention will appear from the following detailed description.

Organic derivative of cellulose materials are thermoplastic and, when heated to an elevated temperature, may be softened sufficiently to cause them to flow. Since organic derivative of cellulose materials are also flammable, the heat generated when said organic derivative of cellulose materials are ignited results in a melting of the burning material and the resulting dripping of burning fragments of molten material greatly increases the fire hazard involved. Numerous proposals have been made for treating organic derivative of cellulose materials with the object of rendering said organic derivative of cellulose textile materials non-flammable. The suggested treatments usually involve the application of chemical agents such as ammonium compounds, for example, to the organic derivative of cellulose materials. While the presence of these compounds on the organic derivative of cellulose materials does reduce their flammability and their tendency to melt and drip when burning, the ammonium compounds as well as other types of compounds usually employed for such flameproofing treatments impart a somewhat stiff and harsh hand to the treated materials. Such a change in the hand of the treated materials is quite undesirable. Furthermore, the protective action achieved by such treatment is usually destroyed quite readily by either washing or dry-cleaning.

We have now found that organic derivative of cellulose materials containing free hydroxyl groups may be rendered completely and permanently non-flammable by reacting the same with a haloalkyl ester of halophosphoric acid. An esterification reaction takes place resulting in the formation of a further ester linkage between the haloalkyl phosphate ester and the free hydroxy group or groups present in the cellulose derivative. Hydrogen chloride is split off as a by-product and the product obtained is a haloalkyl-phosphoric acid ester of the cellulose derivative employed. Since the secondary ester linkage formed between the phosphoric acid and the free hydroxy groups of the cellulose derivative is a chemical bond, neither washing nor dry-cleaning solvents have any harmful effect whatever on the protective action resulting from the esterification reaction. The action is permanent and is far more effective with the use of less material than in the case of materials applied merely to the surface.

As examples of the novel haloalkyl-halophosphonates which may be employed for modifying said organic derivative of cellulose materials by reaction therewith to render the same non-flammable, there may be mentioned bis-(2,3-dichlor-propyl)-chloro-phosphonate, bis-(2-chlorethyl)-chloro-phosphonate and bis-(2,3-dibrom-propyl)-chloro-phosphonate. The chloro-phosphonates are also known as the phosphochloridates.

In reacting organic derivative of cellulose materials with said haloalkyl-halophosphonates, the cellulose derivative is preferably first dried, which drying may be conveniently effected by distilling the same with toluene. The distillation acts to remove any water present, the water distilling over as an azeotrope with the toluene. Pyridine is then added to the cellulose derivative while the latter is still wet with the residual toluene and the solvent action of the pyridine results in the formation of a thin dope. The haloalkyl-halophosphonate ester is then added to the solution which is formed and the reaction which takes place causes the ester linkage between the free hydroxy groups of the cellulose derivative and haloalkyl-halophosphonate ester to form. Usually, the esterification reaction may be carried out satisfactorily at a temperature of $-10$ to $+60°$ C.

In order to separate the haloalkyl-phosphonate cellulose derivative ester from the pyridine solution obtained, the pyridine solution is preferably added to water. The gradual addition of the pyridine solution to water causes the cellulose derivative ester, which is insoluble in water, to precipitate from solution. The precipitate obtained is preferably first soaked in alcohol and then in toluene to remove the pyridine as well as any other impurities.

After several washes with toluene the precipitate is then given a final wash with alcohol and dried. The addition of hydrochloric acid to the aqueous precipitant is advantageous in order to neutralize the pyridine.

The modified cellulose derivative materials thus obtained still possess advantageous thermoplastic properties and may be molded in the same manner as ordinary cellulose derivative materials, namely, by compression molding, injection molding or by extrusion through a suitably shaped orifice, or like expedients. The modified cellulose derivatives are also at least partially soluble in one or more organic solvents such as acetone or ethylene dichloride, and the solutions or gels thus obtained may be subjected to shaping operations when the esterified cellulose derivative is swollen or dissolved by one or more of said solvents.

The improved flame-proofing agents of our invention may be obtained by reacting phosphorus trichloride with an alkylene oxide, a halogenated aliphatic alcohol or a halogenated alkylene oxide and then chlorinating or brominating the haloalkyl phosphoric acid ester to convert the same to the corresponding phosphoric acid ester chloride or bromide. Thus, phosphorus trichloride may be reacted with ethylene oxide, epichlorhydrin or 2,3-dichlorpropanol-1, for example, to form the corresponding triester of phosphorus acid. Upon chlorination, the phosphorus acid triester thus obtained is converted to the bis-chloralkyl ester of chlorphosphoric acid.

In order further to illustrate our invention but without being limited thereto, the following examples are given:

Example I 1748 parts by weight of ethylene oxide are slowly passed, with stirring, into a reaction vessel containing 1600 parts by weight of phosphorus trichloride over the course of about 7 hours while maintaining the temperature of the reaction mixture at about 10° C. The reaction mixture is warmed to about 50° C. after the addition is completed and maintained at this temperature for about 1.5 hours. The reaction mixture is then vacuum distilled over barium carbonate at 1 mm. pressure and the fraction coming over when the liquid temperature is between 140 and 160° C. is separated.

570 parts by weight of this fraction are charged to a reaction vessel and chlorinated at a temperature of about 6° C. Chlorination is continued until about 148 parts by weight of chlorine are absorbed. The product is fractionally distilled under vacuum with the pressure being about 2 to 2.5 mm. and the fraction coming over when the liquid is at a temperature of 146 to 157° C. is separated. The bis-(2-chlorethyl)-chlorophosphonate which is thus obtained has an index of refraction, $n_D^{25}$, of 1.4701 and a density $d_4^{25}$ of 1.4701.

Example II 774 parts by weight of 2,3-dichlor-propanol-1 are placed in a reaction vessel and 137 parts by weight of phosphorus trichloride are slowly added with stirring while maintaining the temperature constant at about 35° C. After standing for about 30 minutes, nitrogen gas is bubbled through the reaction mixture to remove any hydrogen chloride, and the product then distilled over barium carbonate under a pressure of about 5 mm. absolute. The fraction of the crude mixture which distills over when the temperature of the liquid is maintained at between 200 to 230° C. is collected.

124.4 parts by weight of the purified intermediate obtained as a product of the initial distillation is cooled to a temperature of 15° C. and chlorinated until about 20.5 parts by weight of chlorine are absorbed. The hydrogen chloride formed as a by-product is removed by bubbling nitrogen through the reaction mixture while maintaining the same under vacuum.

The product, comprising bis-(2,3-dichlorpropyl)-chlorophosphonate, may then be reacted with a cellulose derivative having free hydroxy groups to impart the desired non-flammable properties thereto.

Example III 109 parts by weight of 2,3-dibrompropanol-1 are placed in a reaction vessel and 22 parts by weight of phosphorus trichloride are slowly added with stirring while maintaining the temperature constant at about 10° C. After stirring for about 30 minutes, chlorine gas is bubbled under the liquid surface with stirring and application of vacuum. This chlorination requires 30 minutes with the temperature maintained at 20° C. After addition of 200 parts by weight of benzene, hydrochloric acid gas is removed, together with the benzene, by stirring and warming to 40° C. and application of vacuum which is gradually increased, over a period of about 3 hours, to about 2 mm. pressure.

The product, comprising bis-(2,3-dibromopropyl)-chlorophosphonate and dibrom-propyl chloride, may then be reacted with a cellulose derivative having free hydroxyl groups to impart the desired non-flammable properties thereto. The dibromopropyl chloride may be removed during isolation of the final cellulosic reaction product. The following examples describe the preferred methods of carrying out such reaction.

Example IV 10.5 parts by weight of cellulose acetate having an acetyl value of 54.5%, calculated as acetic acid, and containing 5% by weight of moisture are distilled with 200 parts by weight of toluene until the major portion of the toluene is distilled off. 196 parts by weight of pyridine, previously dried over barium oxide, are then added to the toluene wet cellulose acetate and the mixture is stirred until solution is complete. 34.8 parts by weight of bis-(2-chlorethyl)-chlorophosphonate, an excess of 500% of that theoretically necessary to react with the free hydroxyl groups present in the cellulose acetate, are added to the solution with stirring and the reaction mixture formed maintained at 50° C. for 4.2 hours. The solution obtained is slowly added to 4000 parts by weight of water and the bis-(2-chlorethyl)-phosphate ester of cellulose acetate formed as a result of the esterification reaction is precipitated from solution. After separating the ester from the water it is soaked in about 2000 parts by weight of ethyl alcohol, then in about 1600 parts by weight of toluene. The wet ester in toluene is allowed to stand for 16 hours, after which it is washed twice with toluene, again with ethyl alcohol and finally dried. The cellulose acetate bis-(2-chlorethyl)-phosphate obtained is completely esterified. The ester has a softening point of 210° C., swells in acetone and forms a gel in ethylene dichloride. It is insoluble in ethyl alcohol, carbon tetrachloride, trichlorethylene, benzene and Stoddard solvent.

Example V 21 parts by weight of cellulose acetate having an acetyl value of 45.8%, calculated as acetic acid, and containing 5% by weight of moisture are distilled with 200 parts by weight of toluene until the major portion of the toluene is distilled off. 392 parts by weight of pyridine, previously dried over barium oxide, are added to the toluene-wet cellulose acetate and the mixture formed stirred until solution is complete. 24.1 parts by weight of bis-(2-chlorethyl)-chlorophosphonate, which is equivalent to that theoretically necessary to react with the free hydroxyl groups present in the cellulose acetate, are added to the pyridine solution with stirring and the temperature maintained at —5° C. for 6 hours. The solution obtained at the completion of the reaction is slowly added to a mixture of 4000 parts by weight of water with about 600 parts by weight of concentrated hydrochloric acid. The bis-(2-chloroethyl)-phosphate ester of cellulose acetate, thus precipitated, is separated from the liquid, dissolved in 240 parts by weight of acetone, and the acetone solution then poured into a mixture of 4000 parts by weight of water and 18 parts by weight of concentrated hydrochloric acid to reprecipitate the ester. The reprecipitated ester, after washing with 640 parts by weight of ethyl alcohol, is soaked in 320 parts by weight of ethyl alcohol for 16 hours and then dried. The bis-(2-chlorethyl)-phosphate ester of cellulose acetate is soluble in acetone, 1,4-dioxane, and pyridine, but insoluble in carbon tetrachloride, ethyl alcohol, and Stoddard solvent. The ester is completely non-flammable.

Example VI 10.5 parts by weight of cellulose acetate having an acetyl value of 54.5%, calculated as acetic acid and containing 5% by weight of moisture are distilled with 200 parts by weight of toluene until the major portion of the toluene is distilled off. 196 parts by weight of pyridine, previously dried over barium oxide, are added to the toluene-wet cellulose acetate and the mixture formed stirred until solution is complete. 22.2 parts by weight of bis-(2,3-dichlorpropyl)-chlorophosphonate are added to the pyridine solution with stirring and the temperature maintained at 50° C. for 9 hours. The solution obtained at the completion of the reaction is slowly added to a mixture of 3250 parts by weight of water with about 220 parts by weight of concentrated hydrochloric acid. The bis-(2,3-dichloropropyl)-phosphonate ester of cellulose acetate in solution is precipitated, separated from the liquid, dissolved in 120 parts by weight of acetone and the acetone solution then poured into 3000 parts by weight of water to reprecipitate the ester. The reprecipitated ester is then soaked into 160 parts by weight of ethyl alcohol for about 45 minutes to remove the solvents and impurities and, after repeating the soaking twice using fresh alcohol each time, the cellulose ester is finally dried. The bis-(2,3-dichloropropyl)-phosphonate ester of cellulose acetate obtained softens at 165° C. and is soluble in acetone and ethylene dichloride. It is insoluble in ethyl alcohol, carbon tetrachloride, trichlorethylene, benzene and Stoddard solvent. The ester is completely non-flammable. About half of the free hydroxyl groups of the original cellulose acetate are esterfied.

Example VII 21 parts by weight of cellulose acetate having an acetyl value of 45.8%, calculated as acetic acid, and containing 5% by weight of moisture, are distilled with 400 parts by weight of toluene until the major portion of the toluene is distilled off. 392 parts by weight of pyridine, previously dried over barium oxide, are then added to the toluene-wet cellulose acetate and the mixture is stirred until solution is complete. 24.1 parts by weight of bis-(2-chloroethyl)-chlorophosphonate, an exact chemical equivalent to react with the free hydroxyl groups present in the cellulose acetate, are added to the solution with stirring and the reaction mixture formed maintained at —5° C. for 2 hours. The solution obtained is slowly added to a mixture of 4000 parts by weight of water with 600 parts by weight of concentrated hydrochloric acid and the bis-(2-chloroethyl)-phosphate ester of cellulose acetate formed as a result of the esterification reaction is thus precipitated from solution. The ester is dissolved in 240 parts by weight of acetone and the acetone solution then poured into a mixture of 4000 parts by weight of water with 18 parts by weight of concentrated hydrochloric acid to reprecipitate the ester. The reprecipitated ester is then soaked for 5 minutes in 360 parts by weight of ethyl alcohol, and after repeating the soaking with fresh alcohol, this time for 3 hours, the cellulose ester is finally dried. The bis-(2-chlorethyl)-phosphate ester of cellulose acetate obtained is soluble in morpholine, acetone, 1,4-dioxane, and methyl Cellosolve. It does not propagate a flame.

Example VIII 10.5 parts by weight of cellulose acetate having an acetyl value of 54.5%, calculated as acetic acid, and containing 5% by weight of moisture, are distilled with 200 parts by weight of toluene until the major portion of the toluene is distilled off. 196 parts by weight of pyridine, previously dried over barium oxide, are added to the toluene-wet cellulose acetate and the mixture formed stirred until solution is complete. 17.4 parts by weight of the product of Example III, containing 12.2 parts by weight of bis-(2,3-dibromopropyl)-chlorophosphonate which is equivalent to that theoretically necessary to react with the free hydroxyl groups present in the cellulose acetate, are added to the pyridine solution with stirring and the temperature maintained at —5° C. for 2 hours. The solution obtained at the completion of the reaction is slowly added to a mixture of 2000 parts by weight of water with 300 parts by weight of concentrated hydrochloric acid. This bis-(2,3-dibromopropyl)-phosphate ester of cellulose acetate, thus precipitated, is separated from the liquid, dissolved in 120 parts by weight of acetone, and the acetone solution then poured into a mixture of 2000 parts by weight of water with 7 parts by weight of concentrated hydrochloric acid to reprecipitate the ester. The reprecipitated ester is soaked 3 times in 160 parts by weight of ethyl alcohol each time, for periods of 5, 10, and 30 minutes respectively, and then dried. The bis-(2,3-dibromopropyl)-phosphate ester of cellulose acetate is soluble in acetone, 1,4-dioxane and methyl Cellosolve, for example, and insoluble in carbon tetrachloride and Stoddard solvent. This ester is completely non-flammable.

Example IX 21 parts by weight of cellulose acetate having an acetyl value of 54.5%, calculated as acetic acid, and containing 5% by weight of moisture, are distilled with 400 parts by weight of toluene until the major portion of the toluene is distilled off. 392 parts by weight of pyridine, previously dried over barium oxide, are added to the toluene-wet cellulose acetate and the mixture formed stirred until solution is complete. 11.4 parts by weight of bis-(2-chloroethyl)-chlorophosphonate, which is equivalent to that theoretically necessary to react with the free hydroxyl groups present in the cellulose acetate, are added to the pyridine solution with stirring and the temperature maintained at −5° C. for 2 hours. The solution obtained at completion of the reaction is slowly added to 4000 parts by weight of water with about 60 parts by weight of concentrated hydrochloric acid. The bis-(2-chlorethyl)-phosphate ester of cellulose acetate, thus precipitated, is separated from the liquid, dissolved in 240 parts by weight of acetone, and the acetone solution then poured into a mixture of 4000 parts by weight of water with 18 parts by weight of concentrated hydrochloric acid to reprecipitate the ester. The reprecipitated ester is soaked first in 320 parts by weight of ethyl alcohol for 1 hour, and then in 320 parts by weight of ethyl alcohol for 16 hours, after which it is dried. A film prepared from an acetone solution of this bis-(2-chloroethyl)-phosphate ester of cellulose acetate does not propagate a flame.

It is to be understood that the foregoing detailed description is given merely by way of illustration and that many variations may be made therein without departing from the spirit of our invention.

Having described our invention, what we desire to secure by Letters Patent is:

1. In a process for the production of non-flammable lower aliphatic acid ester of cellulose materials, the step which comprises esterifying a lower aliphatic acid ester of cellulose material containing free hydroxyl groups with a haloalkyl-chlorophosphonate in which the halogen is selected from the group consisting of chlorine and bromine.

2. In a process for the production of non-flammable lower aliphatic acid ester of cellulose materials, the steps which comprise esterifying a lower aliphatic acid ester of cellulose material containing free hydroxyl groups with bis-(2-chlorethyl)-chlorophosphonate.

3. In a process for the production of non-flammable lower aliphatic acid ester of cellulose materials, the step which comprises esterifying a lower aliphatic acid ester of cellulose material containing free hydroxyl groups with bis-(2,3-dichlorpropyl)-chlorophosphonate.

4. In a process for the production of non-flammable lower aliphatic acid ester of cellulose materials, the step which comprises esterifying a lower aliphatic acid ester of cellulose material containing free hydroxyl groups with bis-(2,3-dibromopropyl)-chlorophosphonate.

5. In a process for the production of non-flammable cellulose acetate materials, the step which comprises esterifying a cellulose acetate material containing free hydroxyl groups with a haloalkyl-chlorophosphonate in which the halogen is selected from the group consisting of chlorine and bromine.

6. In a process for the production of non-flammable cellulose acetate materials, the step which comprises esterifying a cellulose acetate material containing free hydroxyl groups with bis-(2-chlorethyl)-chlorophosphonate.

7. In a process for the production of non-flammable cellulose acetate materials, the step which comprises esterifying a cellulose acetate material containing free hydroxyl groups with bis-(2,3-dichlorpropyl)-chlorphosphonate.

8. In a process for the production of non-flammable cellulose acetate materials, the step which comprises esterifying a cellulose acetate material containing free hydroxyl groups with bis-(2,3-dibromopropyl)-chlorophosphonate.

9. In a process for the production of non-flammable cellulose acetate materials, the steps which comprise immersing the cellulose acetate material containing free hydroxyl groups in toluene, distilling at least the major portion of the toluene therefrom together with any water present, dissolving the cellulose acetate material while wet with toluene in pyridine and esterifying the cellulose acetate material in solution with a haloalkyl-chlorophosphonate in which the halogen is selected from the group consisting of chlorine and bromine.

10. In a process for the production of non-flammable cellulose acetate materials, the steps which comprise immersing the cellulose acetate material containing free hydroxyl groups in toluene, distilling at least the major portion of the toluene therefrom together with any water present, dissolving the cellulose acetate material while wet with toluene in pyridine and esterifying the cellulose acetate material in solution with bis-(2-chlorethyl)-chlorophosphonate.

11. In a process for the production of non-flammable cellulose acetate materials, the steps which comprise immersing the cellulose acetate material containing free hydroxyl groups in toluene, distilling at least the major portion of the toluene therefrom together with any water present, dissolving the cellulose acetate material while wet with toluene in pyridine and esterifying the cellulose acetate material in solution with bis-(2,3-dichlorpropyl)-chlorophosphonate.

12. In a process for the production of non-flammable cellulose acetate materials, the steps which comprise immersing the cellulose acetate material containing free hydroxyl groups in toluene, distilling at least the major portion of the toluene therefrom together with any water present, dissolving the cellulose acetate material while wet with toluene in pyridine and esterifying the cellulose acetate material in solution with bis-(2,3-dibrompropyl)-chlorophosphonate.

13. Lower aliphatic acid ester of cellulose materials having at least a part of the hydroxyl groups therein esterified and attached to the group

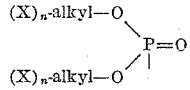

wherein $n$ is a whole number and X is selected from the group consisting of chlorine and bromine.

14. Cellulose acetate materials having at least a part of the hydroxyl groups therein esterified and attached to the group

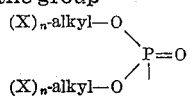

wherein $n$ is a whole number and X is selected from the group consisting of chlorine and bromine.

15. The bis-(2,3-dibromopropyl)-phosphate ester of cellulose acetate.

References Cited in the file of this patent

UNITED STATES PATENTS

| Number | Name | Date |
|---|---|---|
| 1,936,985 | Lommel et al. | Nov. 28, 1933 |
| 2,008,986 | Malm et al. | July 23, 1935 |
| 2,157,164 | Daly et al. | May 9, 1939 |
| 2,169,185 | Shoemaker et al. | Aug. 8, 1939 |
| 2,330,251 | Taylor et al. | Sept. 27, 1943 |
| 2,409,039 | Hardy et al. | Oct. 8, 1946 |
| 2,426,691 | Jenkins | Sept. 2, 1947 |
| 2,494,862 | Craig et al. | Jan. 17, 1950 |

OTHER REFERENCES

Kabachnik, Rossiiskaya "Izvestiy Akad. Nauk S. S. S. R.," o. k. h. m, 1946, 403. Cited on page 272 and relating to bis-(2-chlorethyl)-chlorophosphate, page 242, in Kosolapoff, "Organo Phosphorous Compounds," 1950.